Jan. 23, 1962     D. W. GATHMAN     3,017,739
LONG SPLICE AND METHOD OF MAKING SAME
Filed Jan. 2, 1959     4 Sheets-Sheet 4
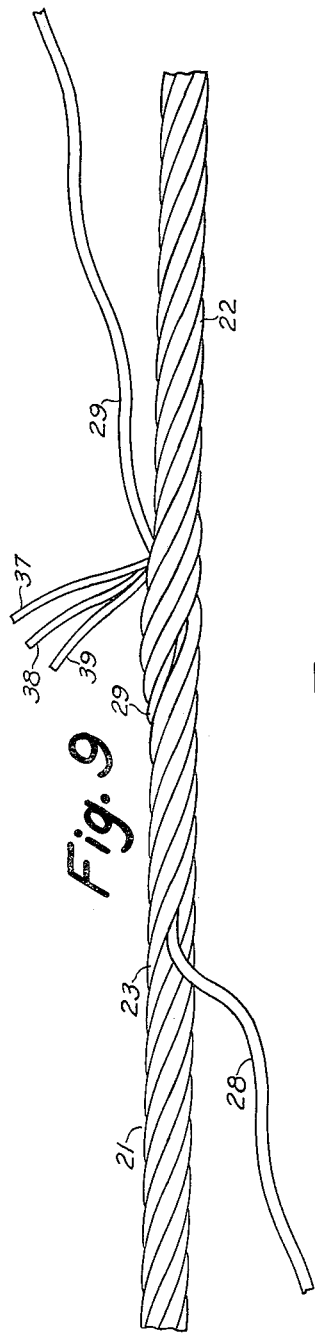
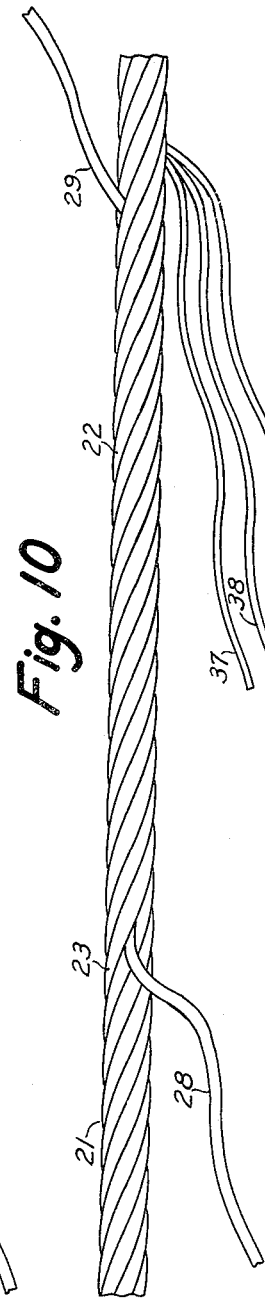
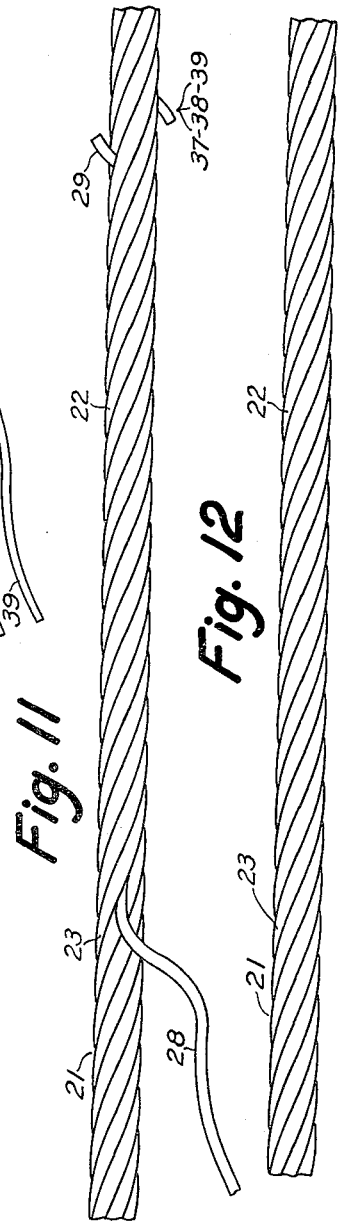
INVENTOR
David W. Gathman
BY Natt M Emery Jr.
ATTORNEY

United States Patent Office 3,017,739
Patented Jan. 23, 1962

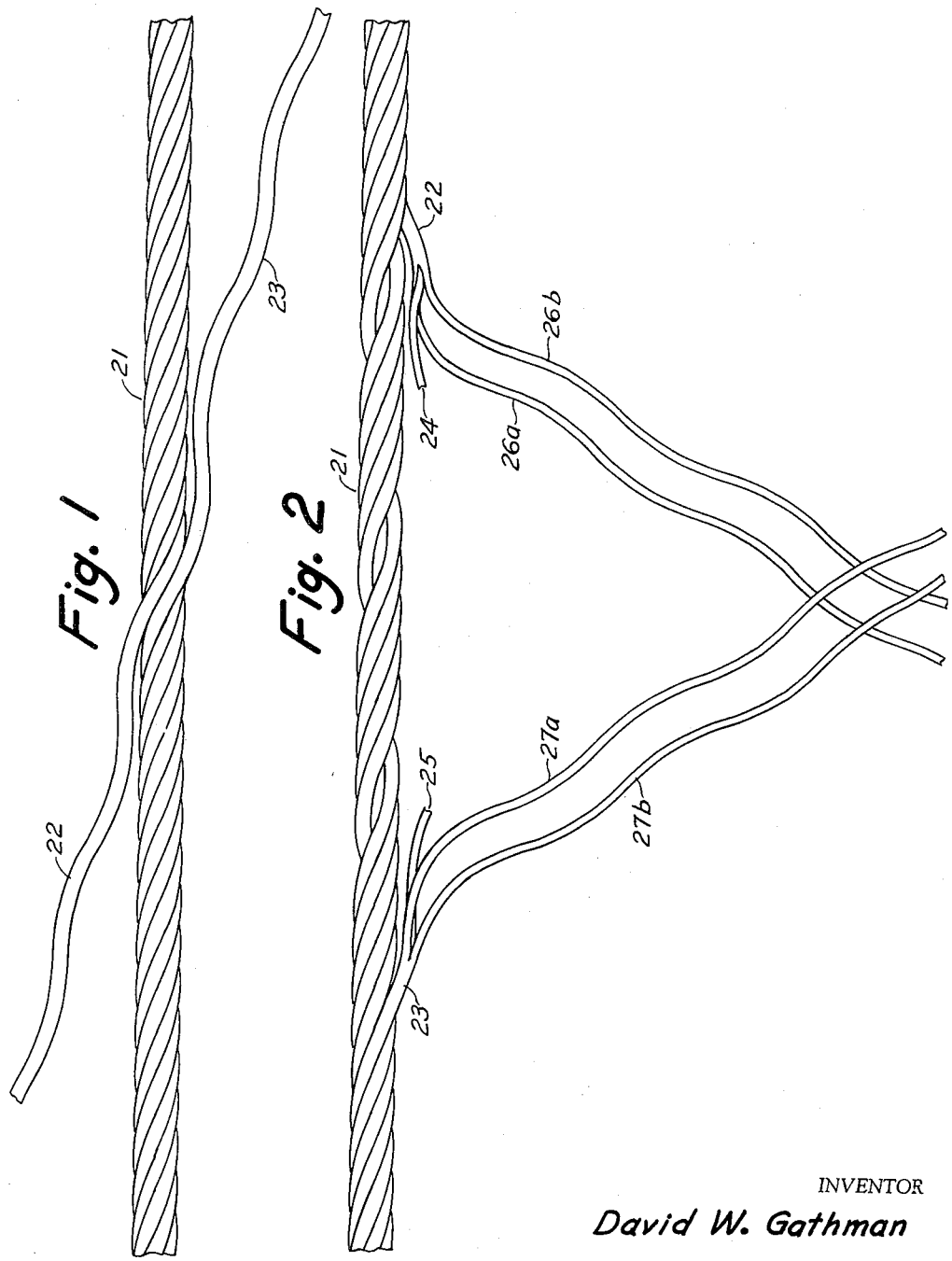

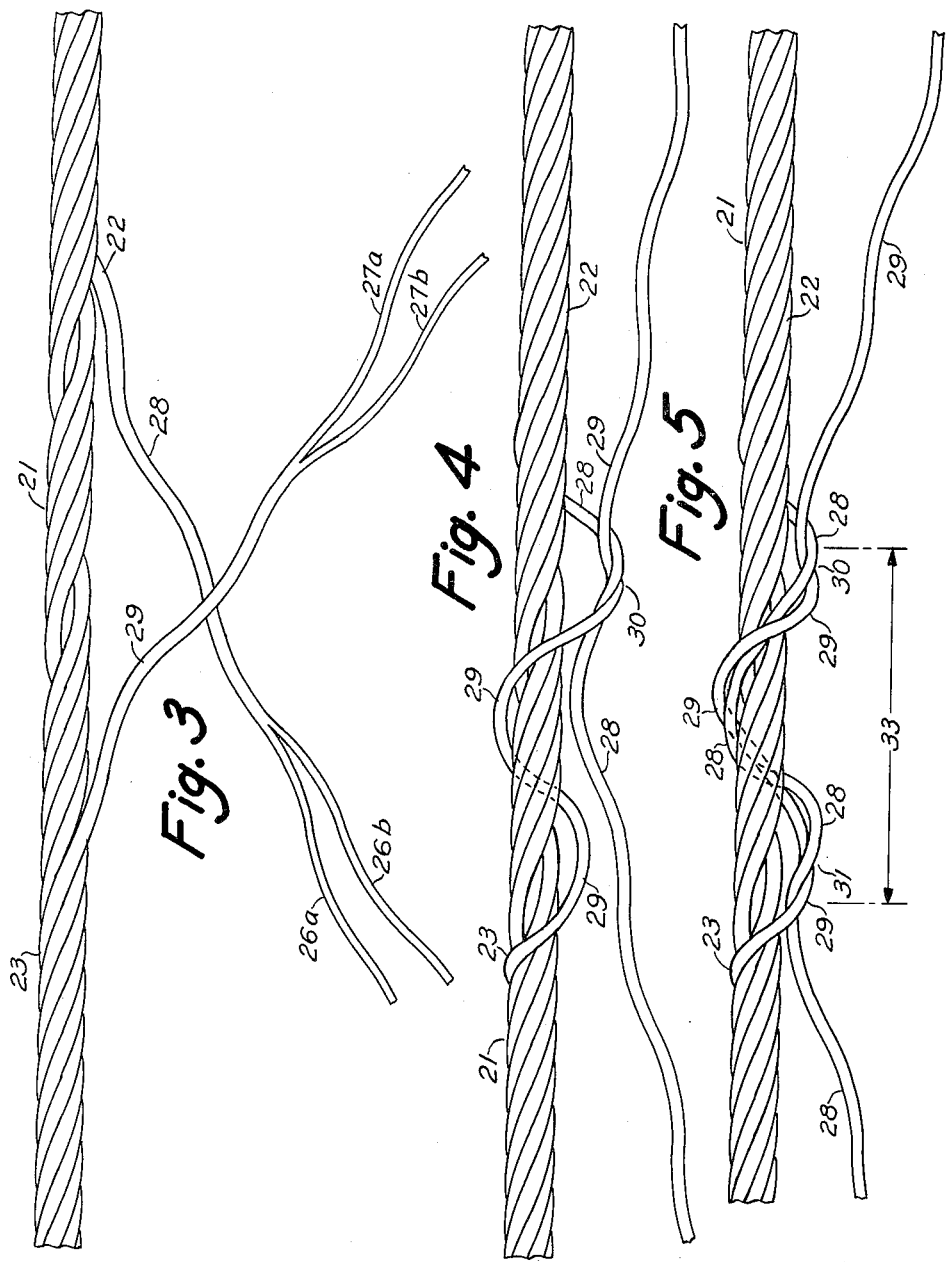

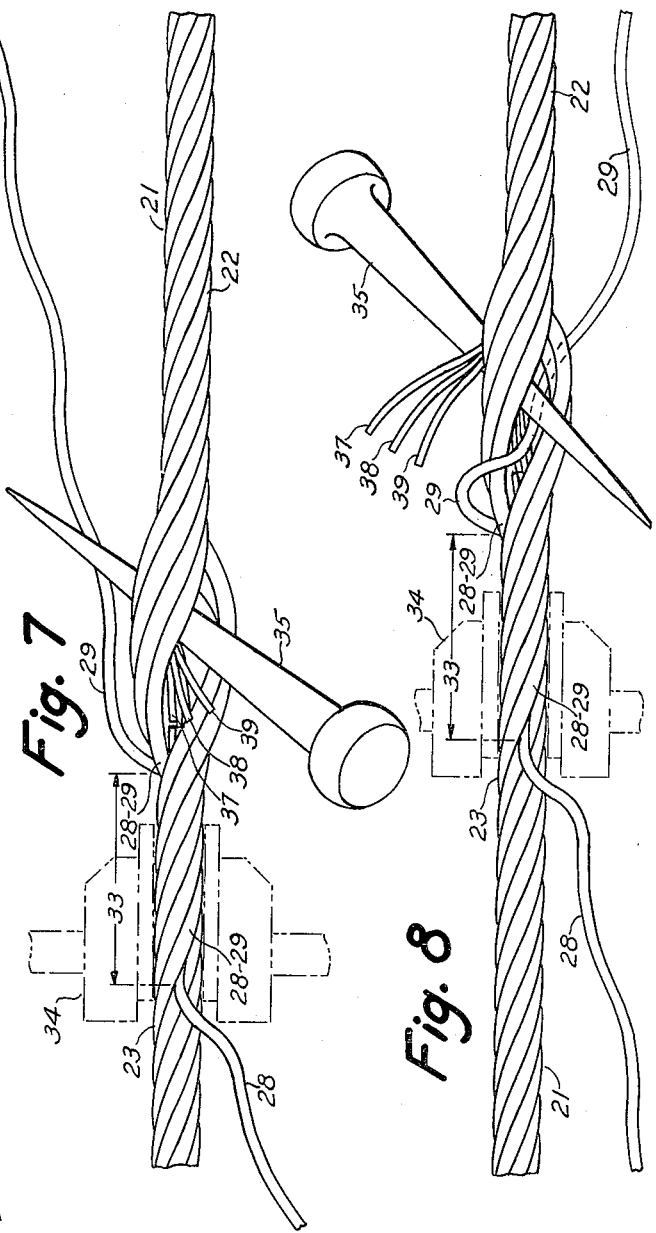

3,017,739
LONG SPLICE AND METHOD OF MAKING SAME
David W. Gathman, Williamsport, Pa., assignor to Bethlehem Steel Company, a corporation of Pennsylvania
Filed Jan. 2, 1959, Ser. No. 784,639
27 Claims. (Cl. 57—142)

This invention relates to the art of splicing so-called long splices in wire rope or other strand material.

More particularly this invention relates to an improved form and method of securing the ends of the laid-in wire strands at the "tucks" in a long splice.

It is an object of this invention to provide a long splice which is stronger than those which have previously been made, particularly under severe operating conditions.

It is a further object of this invention to establish a method for making a long splice in a wire rope such that the diameter of the rope is not increased in the spliced sections in order that it may operate over sheaves smoothly at high speeds without damage to the operating equipment.

It is a further object of this invention to provide a long splice in a wire rope, particularly in an endless wire rope for operation around sheaves, which will hold without slipping when the rope operates under tension at high speed, for instance, such as 200 miles per hour.

In manufacturing this splice I may use a wire rope of 6 x 19 construction, having an independent wire rope center. However other forms of wire rope may be used, for example a rope of 6 x 37 construction with an independent wire rope center. Each of the six strands is a "two operation" strand composed of one center wire, six wires laid around the center wire with a certain length of helix or lay, and a second set of twelve wires with a different length of helix or lay covering the first operation laid around said seven wires. The independent wire rope center is a standard 7 x 7 wire rope consisting of six strands of seven wires each laid around a seventh strand composed of seven wires.

The first operations of forming the long splice of the present invention are the same as in the usual long splicing operation. When the length of the splice has been determined, half that length is measured from the bitter ends of the rope ends to be spliced together and the ropes are marked at these points.

The strands of each rope are unlaid to the marks and the independent wire rope center is cut out or cut off at the marks. The ropes are next "married" together by butting the rope ends together at the site of the cut-off independent wire rope center with the unlaid outer strands of the ropes interposed alternately at the joint, and then three alternate strands from each rope end are unlaid starting from the butted ends of the independent wire rope centers of the ropes for various progressively increasing distances back along each rope, the longest distance being somewhat less than the length of the longest unlaid strand beyond the cut-off independent wire rope center on each respective opposite rope. The strand corresponding to each unlaid strand is then taken from the opposite rope and laid into the space left by the unlaid strand up to the end of said space. Thus at the end of the "marrying" operation there are three alternate strands from each rope laid up into the opposite rope for varying distances. It only remains to get rid of the loose ends in an operation known as "tucking." Ordinarily the tucks are equally spaced along the spliced section of the ropes for balance and better load distribution.

All six tucks are exactly the same. Therefore I will describe only one of the six tucks to illustrate the splice and method of forming it by means of the following specification and attached drawings, in which:

FIGS. 1 through 12 illustrate sequentially the steps involved in making each tuck.

Referring more particularly to the drawings the reference numeral 21 indicates a section of 6 x 19 wire rope having an independent wire rope center, into which rope are laid two strands 22 and 23 one of which has been laid into the rope section 21 from another section of wire rope, not shown, butted against or "married" to rope section 21. Where the two strands 22 and 23 meet and pass each other as seen in FIGURE 1 is where the tucks are made when forming a long splice not only in my invention but also in prior practice. In other words either strand 22 or strand 23 may be considered to have been partly unlaid from rope section 21 up to the center of FIGURE 1 and the other strand either 22 or 23 from another rope section not shown may be considered to have been laid into rope section 21 up to the center of the rope section of FIGURE 1 in the position formerly occupied by the first strand. The strands 22 and 23 are composed of nineteen wires each and are known as two operation strand being composed of a first operation portion consisting of one center section having six wires spiralled around a center wire with a certain length of helix or lay, and a second operation portion of twelve wires with a different length of helix or lay covering the first operation portion of seven wires.

As a first step in forming the tucks of my splice I unlay the outer twelve wires from the center seven wires for a short distance back along both strands 22 and 23. The seven center wires are then cut off close to the rope. This is shown in FIGURE 2 where 24 indicates the cut off center wires of strand 22, 25 indicates the cut off center wires of strand 23. The outer twelve unlaid wires of strands 22 and 23 may be split in two groups as shown in FIGURE 2 to make them easier to handle. The numerals 26a and 26b are the two split apart groups of outer wires of strand 22, and 27a and 27b are the two split apart groups of outer wires of strand 23.

The cut off ends of the seven center wires are welded together so that they will not separate or unravel. I usually cut off the center wires with a burning torch which operation at the same time softens and melts the wires and so incidentally welds them together. However, if the wires are cut off by some other means such as mechanical cutters then a separate welding operation must of course be resorted to.

After the seven center wires 24 and 25 of the two strands 22 and 23 are cut off and welded, the outer twelve second operation wires shown in FIGURES 2 and 3 as split into two groups for each strand as 26a and 26b, and 27a and 27b, are laid up again to form strands without center wires. These strands lacking center wires are designated in FIGURES 3 and 4 as strands 28 and 29. FIGURE 3 shows the groups of second operation wires 26a and 26b, and 27a and 27b partly laid up and FIGURE 4 shows them completely laid up into the new centerless strands 28 and 29.

The two strands 28 and 29 are next tied together in a simple overhand or underhand knot 30 as shown in FIGURE 4. The knot 30 after tying is shifted slightly to the right as also shown in FIGURE 4 in order to leave more room to the left of the knot for the next step of forming a double knot and to attain a more balanced finished structure. The end of one of the strands 28 or 29, in this case shown as strand 28, is then passed or wrapped once around the other strand 29 on the left side of the knot 30 at 31 as shown in FIGURE 5 to in effect form a tied double knot 33. Tied knot 33 is then pulled tight as shown in FIGURE 6 so that it slips down into the position in rope 21 formerly occupied separately by stands 22 and 23. The two strands 28 and 29 tied together can be fitted into the space formerly occupied by the individual strands 22 and 23 because strands 28 and 29 are individually smaller than strands 22 and 23 the first operation center wires of 22 and 23 having been removed before forming 28 and 29.

It is possible to further wrap the ends of the strands 28 or 29 or both around each other to form tied triple or other knots. I have found, however, that such is not usually very practicable particularly in splicing the larger sizes of wire ropes because it is difficult to pull such triple knots tight by any ordinary means due to the friction involved. It is possible also to use but a single knot in place of the double knot which I have illustrated as my preferred embodiment.

After knot 33 is pulled tight the ends of strands 28 and 29 are still loose as shown in FIGURE 6. These strands are next inserted into the core of the rope 21 in a particular way. Since each strand 28 and 29 is inserted into the core and handled in the same manner I will only describe the operation for one strand, for instance 29, it being understood that the other strand 28 and also all the other strands at all the other tucks are formed into the cores of the ropes in exactly the same way.

As shown in FIGURES 7 and 8 the splice is next positioned in a rigger's vise 34 or held by other means and the outer strands separated close to where strand 29 leaves knot 33 by the use of a marlin spike 35 or other means. Three adjacent strands 37, 38 and 39 of the six outer strands of the 7 x 7 independent wire rope center are drawn out through this separation in any manner desirable and cut off as shown in FIGURE 7.

The three adjacent center strands 37, 38 and 39 are next unlaid for substantially two lays or two complete helixes around the independent wire rope center and at the same time the strand 29 is laid into the independent wire rope center helically around the center strands of the independent wire rope center in their place. FIGURE 8 shows the three strands 37, 38 and 39 from the independent wire rope center partly unlaid and removed from between the strands of the wire rope 21 and the strand 29 from one side of the tied knot 33 started into the void created by the removal of the independent wire rope center strands. The exact method of inserting strand 29 into the rope and helically around the independent wire rope center will vary slightly depending upon whether the independent wire rope center has the same or a reverse lay in relation to the wire rope section 21. FIGURE 8 illustrates the operation when the independent wire rope center has the same lay as rope section 21, in this case a right lay. FIGURE 9 shows the strands at the tied knot pulled tight and partly seated in the void that was created by the removal of the independent wire rope center strands. Strand 29 has in this figure been wrapped around one-third of the helix or lay of the independent wire rope center. The wrapping operation is continued until strand 29 from tied knot 33 has been wrapped around the independent wire rope center about two complete times or two lays in place of center strands 37, 38 and 39 which are unlaid for somewhat more than two lays as shown in FIGURE 10. Strand 29 can be laid around the independent wire rope core more than two lays, if desired. If I make a tuck having only one tied knot instead of a double knot like knot 33 as previously explained, I then prefer to lay the strand more than two lays around the independent wire rope core. Conversely the formation of a triple or higher knot might in some cases require less than two full lays around the core. Thus the number of spirals strands 29 makes around the core may be adjusted according to the type of rope being spliced, the number of tied knots in the splice, or the ultimate strength required of the splice.

The next step in my invention is to cut off the three strands 37, 38 and 39, and the strand 29 to a length such that when forced back into the independent wire rope core the ends of wires and the strand will butt against or very nearly against each other.

Before forcing the strands 37, 38 and 39 back into the independent wire rope core, however, I twist the cut off ends of strands 37, 38 and 39 together and anneal them with an acetylene torch or other suitable means so as to soften them.

By annealing or softening the ends of the cut off wires I am enabled to greatly improve the performance and lengthen the life of my splice if it is to be used over sheaves or otherwise bent, particularly if bent at high speed. The reason for this is that often when a splice such as mine is suddenly bent over a sheave the ends of cut off wires in the core of the rope have a tendency not to bend as much as the rope and the cut off ends may be forced or may work between the outer strands of the rope and protrude slightly. As soon as one or several such strand ends protrude from the rope in passing over a sheave or other such device they often tend to catch upon the sheave, are pulled further out and then caught and torn completely out often bringing the entire rope center with them. At high speed a wire rope may be completely torn apart within seconds in this manner. However, by my method of annealing the cut off ends of the center strands the said ends are softened so that when the splice goes over or around a sheave the ends of the wires easily bend with the rope and have no tendency to work to the outside of the rope. If the rope in which the splice is made is not to be used over sheaves it would, of course, not be necesary to anneal the ends of any cut off wires though to do so would do no harm. It is also beneficial if the wires composing the ends of strands 37, 38 and 39 are heated sufficiently so that they soften and weld together. The welding together however is secondary and not ordinarily necessary if the strands are sufficeintly annealed for a distance along their legnth.

Not only may the ends of the strands 37, 38 and 39 of the independent wire rope center be softened by annealing with an acetylene torch but if desired the end of strand 29 may also be softened in this manner. I have found, however, at least for the applications for which I have tested my splice, that it is most important to anneal the cut off ends of the wires from the independent wire rope core.

An alternate method of preventing the inner strands from working out of the center of the rope consists of having a few long uncut wires protruding from both the ends of the cut off strands of the independent wire rope core and the strand laid into the core in its place and twisting the long wires together as the strands are forced into butting relationship in the independent wire rope core. This procedure effectively ties these strands together but it is very difficult to accomplish since there is very little room to work and a certain degree of extra bulk is unavoidable.

FIGURE 11 shows the protruding ends of strand 29 and twisted together strands 37, 38 and 39 after they have been annealed and just prior to forcing them into abutting relationship in the void in the independent wire rope core. After the ends are forced into the center of the rope and butted together one half of the tuck is complete. The other strand 28 from the tied knot 33 is then treated in exactly the same manner to complete the other half of the tuck. FIGURE 12 shows one complete tuck finished. Any bulkiness at the tied strands 28 and 29 will be removed when the rope is put in tension and operated over sheaves for a short period of time. This completes the operation for one tuck. Identical procedures are followed on the other five tucks which complete the splicing of the rope.

Briefly outlined my invention concerns the tucks in a long splice and the method of forming said tucks and consists of the following steps:

(1) Cut off the first operation or center wires which constitute approximately one-half of the cross-sectional area of each strand of the tuck and weld the cut off ends together.

(2) Tie the two centerless portions of the strands together with one or more overhand knots.

(3) Pull out several contiguous strands of the independent wire rope center.

(4) Pass the loose ends of the tied knots into the void left as the contiguous strands are removed from the independent wire rope center.

(5) Continue passing the loose ends into the void and spirally around the center strand of the independent wire rope center until the strands have passed around the center for substantially 2 revolutions.

(6) Cut off the several contiguous strands of the independent wire rope center at this point and preferably anneal the ends.

(7) Replace these ends in the core and abut them against the end of the strand wound helically around the independent wire rope center.

Although I have thus described my invention hereinabove in considerable detail, I do not wish to be limited narrowly to the exact and specific particulars disclosed, but I may also use such substitutes, modifications or equivalents as are included within the scope and spirit of the invention or pointed out in the appended claims.

I claim:

1. In a wire rope having an independent wire rope core, a long splice comprising tucks formed by two outer strands from which a substantial number of wires have been removed tied together in a double knot, a portion of the loose ends of the tied strands being laid into the said independent wire rope core for substantially two lays to replace one or more cut out wires of the independent wire rope core, the cut off ends of the core wires being annealed and abutted against the loose end of the tied strands at the end of the said two lays.

2. In a long splice of a rope having an independent core, tucks comprising two strands having their centers cut out, said strands being tied together in a double knot and the loose ends of the knot being inserted partly into and spirally around the independent core of the rope.

3. In the tucks of a long splice of a rope having an independent core, two opposing strands having undersized cross sections tied together in a double knot, the loose ends of the strands beyond the knot being spiralled around the core of the rope.

4. In a splice made in wire rope having an independent wire rope core, a structure having all loose ends of wires in the independent wire rope core annealed for a substantial linear distance along the strand to an extent such that they will bend easily with the wire rope.

5. The method of increasing the length of service life of a splice in a wire rope having an independent wire rope center to be used in service over sheaves comprising annealing a substantial length of the terminal portions of wires of the independent wire rope center which end at the splice.

6. The method of improving a spliced joint in a wire rope having an independent wire rope core which comprises annealing a substantial length of the end portions of wires of the independent wire rope core which are cut off in forming the tucks of said splice.

7. A long splice of a 6 x 19 construction wire rope with an independent wire rope core and six strands which are two operation strands, the first operation portion being composed of seven wires and the second operation portion being composed of twelve wires, said splice having six tucks each comprised of one strand from each of the two ropes which are spliced together, said strands in the area of the tuck having their first operation portion of seven wires removed so that the strands at the tuck consist only of the second operation portion of twelve wires, said strands being tied together in a double knot at the tuck, their loose ends being inserted and laid into and around the independent wire rope core for substantially two lays in a void left in the said independent wire rope core by the unlaying therefrom for a distance of two lays of three adjacent strands of said independent wire rope core, the ends of said knotted strands laid into said independent wire rope core and said wires unlaid from said independent wire rope core being annealed and butted against each other in said independent wire rope core.

8. The method of making an improved long splice in a 6 x 19 construction wire rope having an independent wire rope core and six strands which are two operation strands in which the first operation portion is composed of seven wires and the second operation portion is composed of twelve wires, comprising forming six tucks of said splice by unlaying the second operation portion of twelve wires for a distance back from where the tuck is to be made along each of the two strands which enter into each tuck, cutting out the first operation portion of seven wires from each of said strands in each tuck near the point to which the second operation portion wires were unlaid, laying up the twelve second operation portion wires again to form two smaller diameter strands without the original first operation portion of seven wires, tying together the two strands in an overhand knot and then wrapping the loose end of one strand once around the other strand to complete in combination with the first tied knot a double knot, pulling said double knot tight, opening the outer six strands of said wire rope at each end of said double knot and cutting three adjacent strands of the independent wire rope core at both these points, unlaying said three strands away from the double knot at both these points for a distance of substantially two complete lays around the independent wire rope core and at the same time laying the two small-diameter strands from the double knot into the two voids in the independent wire rope center which are left by the removal of the three adjacent strands for a distance of substantially two lays from the said independent wire rope center, cutting off the loose ends of the two strands when they have been laid into the independent wire rope center for substantially two full lays, annealing the ends of the cut off strands, cutting off the loose ends of the two sets of three unlaid strands from the independent wire rope center, twisting together and annealing the ends of the three strands, and forcing the ends of the tucked strands and the ends of the independent wire rope center strands back into the voids in the independent wire rope center in abutting relationship to each other to complete each tuck in the splice.

9. A splice of a wire rope having an independent wire rope center, said splice having six tucks each comprised of one strand from each of the two ropes which are spliced together, said strands in the area of the tuck being composed of fewer wires than normal throughout the rope, said strands being tied together in a double knot at the tuck, the loose ends of said knots being inserted into the rope and laid into and around the wire rope center for substantially two lays in place of certain strands of the independent wire rope center.

10. A splice of a wire rope having an independent wire rope center, said splice having a plurality of tucks each comprised of two strands tied together in a double knot with the ends of the strands passing into the center of the rope and laid around the independent wire rope center.

11. A method of forming a tuck in a splice made on a two operation strand wire rope having an independent wire rope center, comprising taking out the first operation portion which constitutes approximately one-half of each strand, tying the two strands at the tuck together in one or more knots, removing some of the stands of the independent wire rope core, passing the loose ends of the tied knot into the void left as the strands are removed from the independent wire rope core, continuing to pass the loose ends into the void and sprirally around the center strand of the independent wire rope center until the tucked strands have passed around the center strand of the independent wire rope center at least two revolutions.

12. A method of forming the tucks in a splice comprising removing a substantial number of wires from each strand entering in the tuck, tying the strands together in a double knot and laying the remaining ends of the strands around the center of the rope in a manner such that they enter into the structure of the lay of the rope.

13. A long splice of a 6 x 37 construction wire rope with an independent wire rope center and six strands which are two operation strands, said splice having six tucks each comprised of one strand from each of the two rope ends which are spliced together, said strands in the area of the tuck having their first operation wires removed so that the strands at the tuck consist only of the second operation outside wires, said strands being tied together in at least one knot at the tuck, their loose ends being inserted and laid into and around the independent wire rope center for at least substantially two lays in a void left in the said independent wire rope center by the unlaying therefrom for an equal distance of several adjacent strands of said independent wire rope center.

14. A splice of wire rope having an independent wire rope center, said splice having a number of tucks equal to the number of strands of which the ropes are composed, each tuck being comprised of one strand from each of the two ropes which are spliced together, said strands in the area of the tuck being composed of fewer wires than normal throughout the rope, said strands being tied together in at least one knot at the tuck, the loose ends of said knots being inserted into the rope and laid into and around the wire rope center for substantially two or more lays in place of certain removed strands of the independent wire rope center.

15. Method of splicing two ends of wire rope having an independent wire rope center comprising (a) removing the independent wire rope center from said ends for a selected distance, marrying the said ends, and interlaying the outer strands in the usual manner of making a long splice, whereby each pair of interlaid strands intersects at a different point along the length of the splice, and tucking the ends of each intersecting pair of strands by (b) cutting the center wires from each strand for a selected distance back of the point of intersection, (c) intertwining the outer wires of each strand up to the points at which said center wires have been cut, (d) removing a plurality of adjacent strands of the independent wire rope center for a selected distance back of said last mentioned points, and (e) laying the ends of the adjacent outer strand wires in the space provided by the removal of said independent wire rope center strands.

16. A method of forming the tucks in a splice of a wire rope having an independent wire rope center comprising knotting together the strands forming the tucks and laying the free ends of the strands around the independent wire rope center in a manner such that they enter into the structure of the lay of the said center.

17. An improvement in forming the tucks of a long splice in wire rope having an independent wire rope center comprising decreasing the diameter of the portions of strands entering into the tuck by the removal of wires therein; knotting said strands together and laying the ends of the strands helically around the independent wire rope center so that they enter into the structure of the said center for at least two lays.

18. In a long splice of a rope having an independent core, tucks comprising two strands having their centers cut out, said strands being tied together in one or more knots and the loose ends of the knot being inserted partly into and spirally around the independent core of the rope.

19. A splice of a wire rope having an independent wire rope center, said splice having six tucks each comprised of one strand from each of the two ropes which are spliced together, said strands in the area of the tuck being composed of fewer wires than normal throughout the rope, said strands being tied together in one or more knots at the tuck, the loose ends of said knots being inserted into the rope and laid into and around the wire rope center for substantially two lays in place of certain strands of the independent wire rope center.

20. A long splice for a wire rope having an independent wire rope center wherein (a) the strands forming each tuck are knotted together, (b) one or more but substantially less than all strands are cut and removed from the independent wire rope center adjacent each tuck, and (c) the free ends of the first mentioned strands forming each tuck are laid into the space left by the removal of the one or more strands from the independent wire rope center.

21. A long splice for a wire rope having an independent wire rope center wherein (a) the strands forming each tuck are reduced in cross sectional area by removing constituent wires therefrom, (b) the reduced strands forming each tuck are knotted together, (c) one or more but substantially less than all strands are cut and removed from the independent wire rope center adjacent each tuck, and (d) the free ends of the first mentioned reduced strands forming each tuck are laid into the space left by the removal of the strand from the independent wire rope center.

22. In a long splice of a wire rope having an independent wire rope center, an improved method of inserting the free ends of strands forming the tucks into the center of the wire rope comprising (a) removing one or more but substantially less than all strands from the independent wire rope center, and (b) laying the said free ends of the strands from the tucks into the spaces left by the removal of the one or more strands from the independent wire rope center.

23. A splice for wire rope having an independent wire rope core wherein the terminal portions of wires terminating in said independent wire rope core are annealed for a substantial linear distance from their ends.

24. The structure of claim 20, wherein the cut strands of the independent wire rope center are annealed for a substantial distance from their ends.

25. The structure of claim 21, wherein cut strands of the independent wire rope center are annealed for a substantial distance from their ends.

26. The structure of claim 20, wherein the cut strands of the independent wire rope center and the strands forming the tucks are annealed for a substantial distance from their ends.

27. The structure of claim 21, wherein the cut strands of the independent wire rope center and the strands forming the tucks are annealed for a substantial distance from their ends.

References Cited in the file of this patent
UNITED STATES PATENTS

| | | |
|---|---|---|
| 345,719 | Nash | July 20, 1886 |
| 369,435 | Collins | Sept. 6, 1887 |
| 386,690 | Collins | July 24, 1888 |
| 400,748 | Collins | Apr. 2, 1889 |
| 460,407 | Thompson | Sept. 29, 1891 |
| 620,739 | Christensen | Mar. 7, 1899 |
| 2,019,520 | Wood | Nov. 5, 1935 |
| 2,558,553 | Hansen et al. | June 26, 1951 |

OTHER REFERENCES

"Splicing Wire and Fiber Rope," Graumont and Hensel, Cornell Maritime Press, New York, 1945; pages 43 and 44. (Copy available in Division 21.)